United States Patent
Suter et al.

(10) Patent No.: US 7,574,887 B2
(45) Date of Patent: Aug. 18, 2009

(54) FORMING MACHINE COMPRISING A SHEARING DEVICE FOR A SHEARING BAR

(75) Inventors: Michael Suter, Allschwil (CH); Pascal Stemmelin, Moernarch (FR)

(73) Assignee: Hatebur Umformmaschinen AG, Reinach (CH)

(*) Notice: Subject to any disclaimer, the term of this patent is extended or adjusted under 35 U.S.C. 154(b) by 34 days.

(21) Appl. No.: 11/782,426

(22) Filed: Jul. 24, 2007

(65) Prior Publication Data

US 2007/0261524 A1 Nov. 15, 2007

Related U.S. Application Data

(63) Continuation of application No. PCT/CH2006/000091, filed on Feb. 13, 2006.

(30) Foreign Application Priority Data

Feb. 17, 2005 (CH) .......................... 278/5

(51) Int. Cl.
*B21D 28/00* (2006.01)
(52) U.S. Cl. .............. 72/338; 83/15; 83/578; 83/694
(58) Field of Classification Search ............. 83/15, 83/78–80, 694, 578, 196, 198, 255; 72/338
See application file for complete search history.

(56) References Cited

U.S. PATENT DOCUMENTS

| | | | | |
|---|---|---|---|---|
| 3,252,364 A | * | 5/1966 | Veres et al. ............... | 83/14 |
| 3,334,533 A | * | 8/1967 | Davis, Jr. .................. | 83/100 |
| 3,451,297 A | * | 6/1969 | Reis et al. ................. | 83/198 |
| 3,750,509 A | * | 8/1973 | Kruse ........................ | 83/198 |
| 4,106,147 A | | 8/1978 | Furuto | |
| 4,328,725 A | * | 5/1982 | Gschwend ................. | 83/27 |

(Continued)

FOREIGN PATENT DOCUMENTS

DE 2711557 9/1977

(Continued)

OTHER PUBLICATIONS

A search report on Taiwanese Patent Application No. 95103082 dated Aug. 27, 2007.

*Primary Examiner*—Kenneth E. Peterson
*Assistant Examiner*—Sean Michalski
(74) *Attorney, Agent, or Firm*—Brinks Hofer Gilson & Lione

(57) ABSTRACT

A forming machine has a shearing device for shearing a bar. This shearing device comprises a fixed blade, with a passage for feeding through the bar to be sheared, and a shearing part which can be moved forward and backward parallel to the fixed blade. The shearing part comprises a first shearing blade, with which a bar section projecting from the fixed blade can be sheared in a forward movement of the shearing part, and a second shearing blade, with which a bar section projecting from the fixed blade can be sheared in a backward movement of the shearing part. In addition, the forming machine has a disposal point, to which the second shearing blade transports, as scrap pieces, all the bar sections sheared by it. Due to scrap pieces being sheared solely by means of the second shearing blade, empty places in the forming stations and the associated disadvantages can be avoided.

7 Claims, 6 Drawing Sheets

U.S. PATENT DOCUMENTS

| | | | | |
|---|---|---|---|---|
| 4,361,174 A | * | 11/1982 | Jenkins et al. | 140/140 |
| 4,559,854 A | * | 12/1985 | Jurgens | 83/170 |
| 4,651,602 A | * | 3/1987 | Harrold et al. | 83/15 |
| 4,761,980 A | * | 8/1988 | Kawashima et al. | 72/20.5 |
| 5,109,740 A | * | 5/1992 | Kohn et al. | 83/15 |
| 5,156,073 A | * | 10/1992 | Zanzerl et al. | 83/13 |
| 5,697,243 A | * | 12/1997 | Ueda et al. | 72/337 |
| 6,024,226 A | * | 2/2000 | Olivier | 209/172.5 |
| 6,352,012 B1 | * | 3/2002 | Borzym et al. | 83/186 |
| 6,705,979 B1 | * | 3/2004 | Sakaguchi et al. | 493/82 |
| 7,073,420 B2 | * | 7/2006 | Kuo | 83/112 |
| 7,107,889 B2 | * | 9/2006 | Marocco | 83/198 |
| 2003/0200849 A1 | * | 10/2003 | Kochi | 83/199 |
| 2007/0261524 A1 | * | 11/2007 | Suter et al. | 83/13 |

FOREIGN PATENT DOCUMENTS

| | | |
|---|---|---|
| DE | 2940375 | 4/1981 |
| DE | 19850616 | 5/2000 |
| EP | 0011293 | 5/1980 |
| TW | 306359 | 5/1997 |
| WO | WO 01/28711 | 4/2001 |

* cited by examiner

FORMING MACHINE COMPRISING A SHEARING DEVICE FOR A SHEARING BAR

This application claims the benefit of priority as a continuation of International Application No. PCT/CH2006/000091 filed Feb. 13, 2006, which claims the benefit of priority from Swiss Patent Application No. 278/05, filed Feb. 17, 2005. Application Nos. PCT/CH2006/000091 and 278/05 are incorporated by reference.

FIELD OF THE INVENTION

The present invention relates to a forming machine having a shearing device for shearing a bar.

BACKGROUND

In forming machines having one or more forming stations, a section sheared off from a bar is often fed to the first forming station for forming. The bar is normally sheared in a separate shearing station by means of a fixed blade and a shearing blade which is displaceable relative thereto and is moved back and forth by a shearing slide. It is known to design the fixed blade and the shearing blade in various possible ways.

In cold-forming machines, for example, closed circular blades are often used as the fixed blade and the shearing blade. The bar to be sheared is pushed into passages through the fixed blade and the shearing blade, and the shearing blade is then rapidly displaced transversely to the bar, as a result of which a section is sheared off from the bar.

In hot-forming machines, the fixed blade and the shearing blade are normally designed as half blades, that is to say as blades which bear against the bar only over part of the bar circumference, the bar to be sheared being held between the half blades and clamping jaws during the shearing. After the shearing, the clamping jaws are moved away for the advance and aeration of the bar. To center the bar, a separate centering device is provided.

Disclosed in WO 01/28711 A1 is a forming machine having a shearing device which has a slotted circular blade, consisting of a fixed blade designed as a half blade and of a centering and clamping piece movable relative thereto, and a shearing blade which interacts with the slotted circular blade and is displaceable relative thereto and is designed as a closed circular blade.

EP 0 011 293 A discloses a forming machine having a shearing device, the shearing part of which has two shearing blades, a first shearing blade, during forward movements of the shearing part, shearing bar sections which are fed to a first forming station, and a second shearing blade, during backward movements of the shearing part, shearing bar sections which are fed to a second forming station.

With all these known shearing devices, scrap pieces are sheared at a bar transition from a preceding bar to be sheared to the following bar to be sheared, these scrap pieces comprising at least the end of the preceding bar and the start of the following bar. Since these scrap pieces do not have the desired length of bar sections to be subsequently processed in the following forming stations, they are normally rejected and are not fed to the forming stations. The result of this is that there are empty spaces in the forming stations, which leads to deformations of the forming machine during the forming which are different from those in the fully loaded state. Such different deformations lead to fluctuations in the geometry of the acceptable parts produced. In addition, in hot-forming machines, different cooling of the tools and thermal shocks occur. All this can reduce the operating time of the forming machine up to the next tool change.

In the worse case, however, it is also conceivable that two end pieces (bar end and bar start following it) which are sticking together and are too short may certainly jointly have the desired length, but, pressed together, only apparently form a homogenous part. This error may possibly not be detectable and may then lead during operation to component failure, which is problematical in particular in the case of safety components, such as, for example, stub axles or steering parts.

In view of the disadvantages of the hitherto known shearing devices described above, the object of the invention is as follows: a forming machine having a shearing device for shearing a bar of the type mentioned at the beginning and a method of operating such a forming machine with which empty spaces in the forming stations can be avoided are to be provided.

SUMMARY

This object is achieved by the forming machine according to the invention and by the method according to the invention for operating a forming machine. Preferred embodiment variants follow.

The essence of the invention is as follows: a forming machine has a shearing device for shearing a bar, the shearing device comprising a fixed blade, with a passage for feeding through the bar to be sheared, and a shearing part which can be moved forward and backward parallel to the fixed blade. The shearing part has a first shearing blade, with which a bar section projecting from the fixed blade can be sheared in a forward movement of the shearing part, and a second shearing blade, with which a bar section projecting from the fixed blade can be sheared in a backward movement of the shearing part. In addition, the forming machine has a disposal point, to which the second shearing blade transports, as scrap pieces, all the bar sections sheared by it.

Owing to the fact that the forming machine has a disposal point, to which the second shearing blade transports, as scrap pieces, all the bar sections sheared by it, there is a second shearing blade which serves solely to shear the bar-section scrap pieces, which are then disposed of. In every forward movement of the shearing part, one-piece bar sections having the desired length are therefore always sheared with the first shearing blade, these bar sections then being subsequently processed in the following forming stations. In this way, empty spaces in the forming stations and the associated disadvantages can be avoided.

The shearing part is preferably arranged on a shearing slide which can be moved forward and backward linearly in a forming cycle of the forming machine. Since the shearing slide can be moved forward and backward in a forming cycle, a new bar section which has the desired length can be sheared at the same time with each forming step. Possible scrap pieces can be sheared during the backward movement of the shearing slide, so that the forming cycle of the forming machine can be maintained without any problems. In addition, a linear movement of the shearing slide can be realized in a simple manner.

In an advantageous embodiment variant, the forming machine has a bar stop, against which the bar-section-side end of the bar to be sheared bears during the shearing and which can be adjusted in the direction toward or away from the fixed blade. Alternatively, instead of the bar stop, the fixed blade and also the first and second shearing blades can be adjusted in the direction toward or away from the bar stop.

The adjustability, achieved in this way, of the bar stop relative to the shearing plane enables the length of the bar section which is to be sheared to be set, the end of which bears against the bar stop during the shearing. This makes possible a corrective shearing if the bar transition from one bar to the next lies unfavorably.

The forming machine according to the invention may be a hot-forming machine or a cold-forming machine. The invention is especially advantageous in the case of hot-forming machines, since work is normally carried out there with relatively short bars and bar transitions are therefore frequent. In cold-forming machines, thin bars in the form of wire are often processed, this wire being relatively long and being present in the form of rolls. Bar transitions are relatively rare here. Nonetheless, the invention can also be used in cold-forming machines.

In the method according to the invention for operating a forming machine having a shearing device, bar sections having a desired length which are subsequently processed in at least one forming station of the forming machine after the shearing are sheared by the first shearing blade in a forward movement of the shearing part, and scrap pieces, which are not subsequently processed in a forming station, are sheared by the second shearing blade in a backward movement. As already mentioned, empty spaces in the forming stations and the associated disadvantages can be avoided in this way.

The bar transition from a preceding bar to be sheared to the following bar to be sheared is preferably sheared by the second shearing blade in a backward movement of the shearing part. At a bar transition from one bar to the next, scrap pieces normally occur, since the bar transition does not generally lie exactly at a desired parting point. In addition, in the normal case, the quality of the end face of the bar ends and starts is likewise inadequate, so that cuts which would have precisely the correct length by chance also have to be rejected. The scrap pieces are sheared in a backward movement of the shearing part, so that they do not pass to the forming stations and empty spaces do not occur there despite that.

First of all the position of the bar transition from a preceding bar to be sheared to the following bar to be sheared is advantageously determined. The length which the last bar section at the end of the preceding bar to be sheared would have after the shearing of bar sections having the desired length is calculated therefrom. If the calculated length of this last bar section is less than a predefined safety length or is greater than the desired length minus the safety length, corrective shearing is carried out. During this corrective shearing, an additional scrap piece is sheared by the second shearing blade in a backward movement of the shearing part, the length of said scrap piece being such that the length, calculated with regard to this scrap piece, of the last bar section is greater than the predefined safety length and less than the desired length minus the safety length.

The safety length and the method referred to serve to ensure that the bar transition is not located too close to one of the shearing planes. This ensures neat shearing, so that the bar sections which are adjacent to the scrap pieces adjoining the bar transition can be used for forming.

In a preferred method, the additional scrap piece of the corrective shearing is shorter than the desired length. The bar mass lost for the forming is thus relatively small.

In an alternative advantageous method, the additional scrap piece of the corrective shearing is longer than the desired length. A longitudinal displacement of the bar transition can also be achieved in this way.

The length of the additional scrap piece of the corrective shearing is advantageously set by adjusting a bar stop, against which the bar-section-side end of the bar to be sheared bears during the shearing, and by advancing the bar to be sheared up to the bar stop. The bar to be sheared can thus always bear against the bar stop during the shearing.

The shearing of an additional scrap piece having a length less than the desired length is preferably achieved by the bar to be sheared being advanced to a smaller extent than in the case of bar sections having the desired length, so that it projects from the fixed blade to a smaller extent during the shearing. To this end, the bar stop, against which the bar to be sheared normally bears during the shearing, need not be displaced and can therefore be arranged in a fixed position, which simplifies the construction.

The forming machine according to the invention having a shearing device for shearing a bar and the method according to the invention for operating such a device are described in detail below with reference to the attached drawings and with the aid of exemplary embodiments. In the drawings:

DETAILED DESCRIPTION

Figure 1:
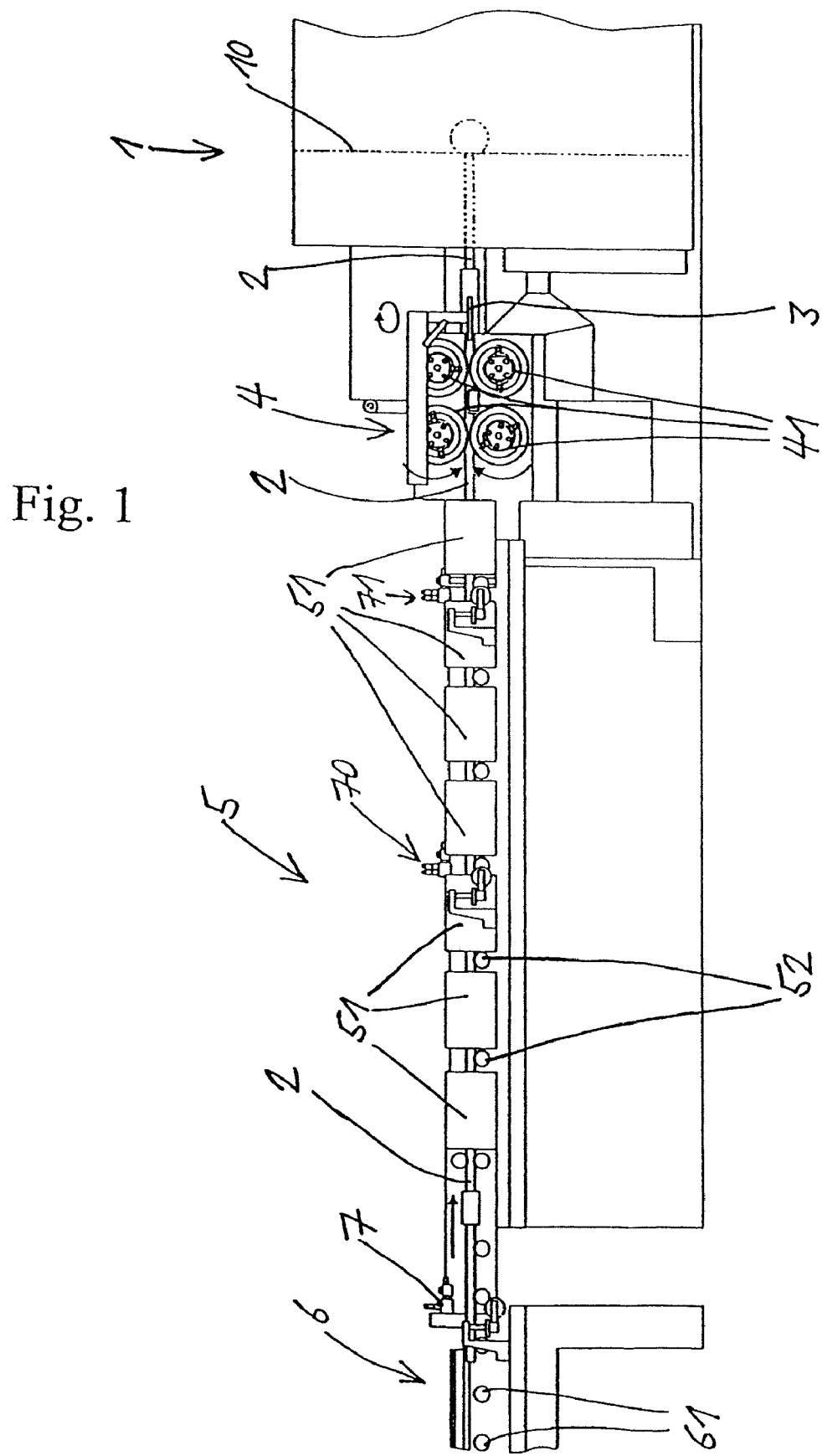
FIG. 1 shows an exemplary embodiment of a forming machine according to the invention having a shearing device for shearing a bar and a bar feeding arrangement in a side view.

Shown in FIG. 1 is an exemplary embodiment of a forming machine 1 having a shearing device for shearing a bar 2 and a bar feeding arrangement. The shearing plane 10 of the shearing device is depicted by a dot-dash line. The bar feeding arrangement comprises a bar draw-in device 4 which draws in a bar 2 from a heating device 5 and feeds it to the shearing device of the forming machine 1. To this end, the bar draw-in device 4 has four draw-in rollers 41 which rotate in the arrow direction. The advance of the bar 2 can be accurately measured by means of a measuring wheel 3 arranged at the end of the bar draw-in device 4.

The heating device 5, which has a multiplicity of heaters 51, serves to heat the bar 2 before the forming.

The forming involves a hot-forming machine. The bar 2 rests in the heating device 5 on a multiplicity of feed rollers 52 which convey the bar 2 toward the bar draw-in device 4. The bar 2 comes from a bar magazine 6 which has feed rollers 61. During the bar advance, gaps may temporarily occur between two successive bars 2 on account of nonuniform draw-in movements of the bar draw-in device 4 which are related to the process. These gaps disappear at the latest after the drawing-in of the following bar 2 by the bar draw-in device 4.

In order to detect the position of the bar transition from one bar 2 to the next, light barriers 7, 70 and 71 are arranged at the heating device 5. These light barriers can determine in each case where the bar transition is exactly located, and corrective shearing can be initiated if necessary, which will be dealt with in detail further below. In order that the bar transition is correctly detected even if there is no gap between two successive bars 2 just at that moment in the region of a light barrier on account of a draw-in movement of the bar draw-in device 4, the light barriers 70 and 71 are designed as double light barriers.

The following stipulation applies to the rest of the description in its entirety. If reference numerals are included in a figure for the purpose of diagrammatic clarity but are not mentioned in the directly associated text of the description, their explanation is referred to in the preceding descriptions of the figures.

Figure 2:
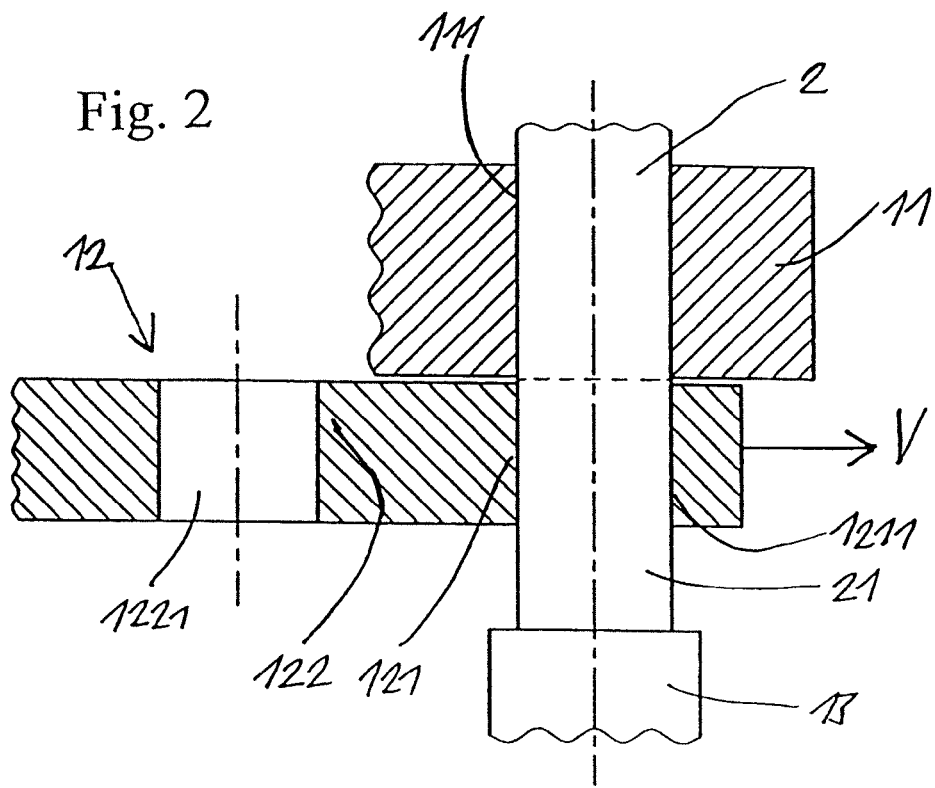
FIGS. 2 and 3 schematically show shearing of a bar section having a desired length, using a first shearing blade moving forward.
Figure 3:
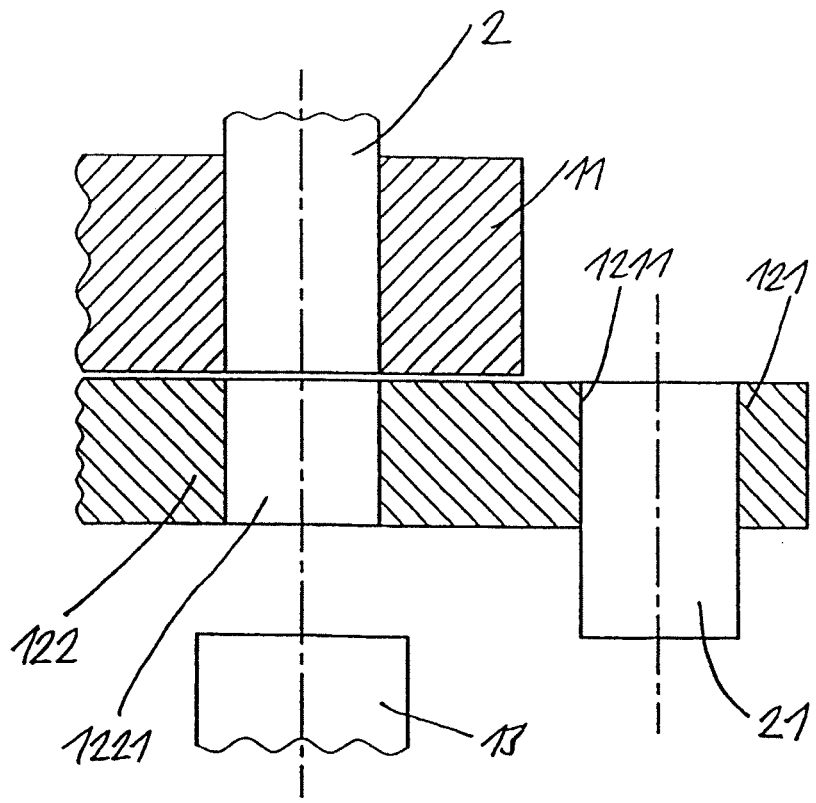

FIGS. 2 and 3 show the shearing device of the forming machine 1 during the shearing of a bar section 21 of a bar 2, this bar section 21 having a desired length and being subsequently formed in the following forming stations of the forming machine 1. The shearing device comprises a fixed blade 11, a shearing part 12 which can be moved forward and backward parallel to the fixed blade 11 and has a first shearing blade 121 and a second shearing blade 122, and a bar stop 13. The fixed blade 11, the first shearing blade 121 and the second shearing blade 122 are each designed as a closed circular blade having a passage 111, 1211 or 1221, respectively, for feeding through the bar 2 to be sheared.

In the situation according to FIG. 2, the bar 2 to be sheared is fed through the passage 111 of the fixed blade 11 and the passage 1211 of the first shearing blade 121 and bears with its bar-section-side end against the bar stop 13. The bar section 21 projecting from the fixed blade 111 is sheared off from the rest of the bar 2 by the forward movement of the shearing part 12 in the direction of the arrow V and is transported by the first shearing blade 121 to a location at which it can be received by a gripper or in another manner for the first forming station. In this situation shown in FIG. 3, the passage 1221 of the second shearing blade 122 lies directly in continuation of the passage 111 of the fixed blade 11.

Figure 4:
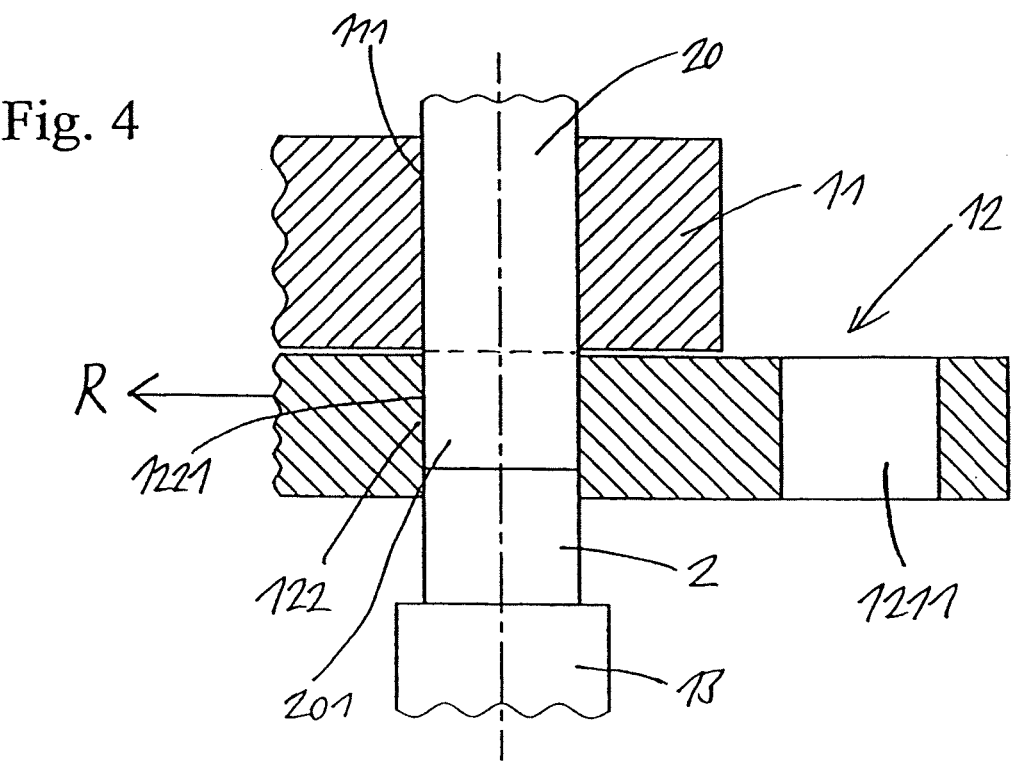
FIGS. 4 and 5 schematically show shearing of a bar transition using a second shearing blade moving backward.
Figure 5:
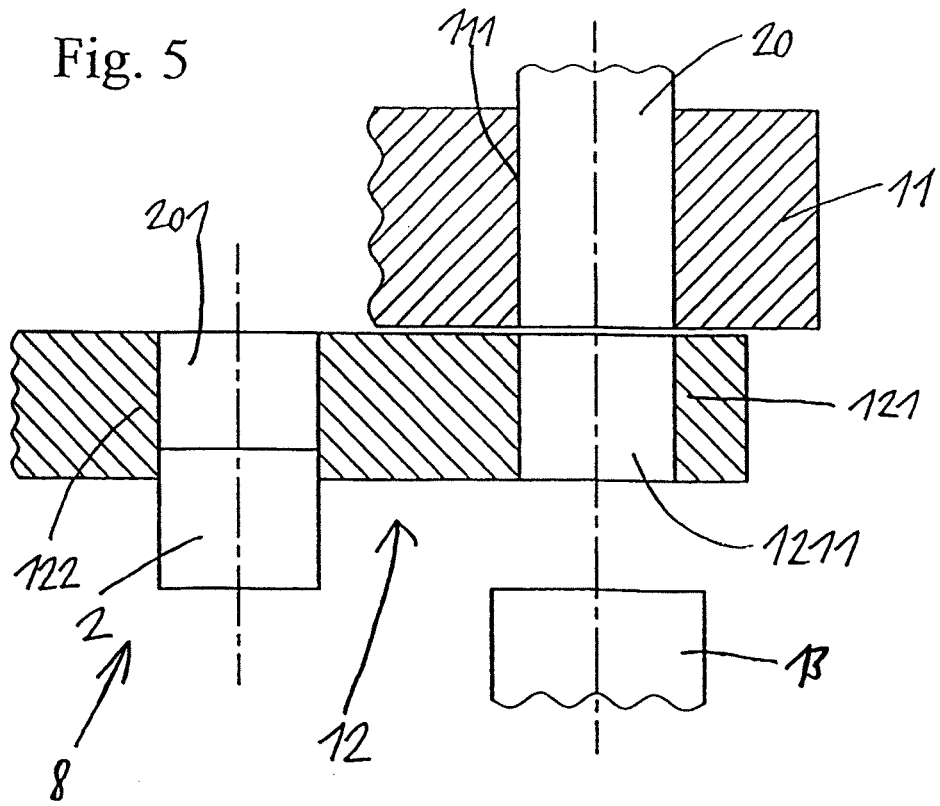

FIGS. 4 and 5 show how the bar transition from a preceding bar 2 to be sheared to a following bar 20 to be sheared is sheared by the second shearing blade 122 in a backward movement of the shearing part.

FIG. 4 shows the situation in which the bars 2 and 20 to be sheared are fed through the passage 111 of the fixed blade 11 and the passage 1221 of the second shearing blade 122 and that end of the bar 2 which is remote from the bar transition bears against the bar stop 13. Here, the bar 2 consists only of a last small bar section, the length of which is less than the desired length. A bar section 201 projecting from the fixed blade 111 is sheared off from the rest of the bar 20 by a backward movement of the shearing part 12 in the direction of the arrow R and is transported by the second shearing blade 122 together with the bar 2 to a disposal point 8, from where the bar section 201 and the bar 2 can be disposed of. In this situation shown in FIG. 5, the passage 1211 of the first shearing blade 121 again lies congruently in the continuation of the passage 111 of the fixed blade 11.

Figure 6:
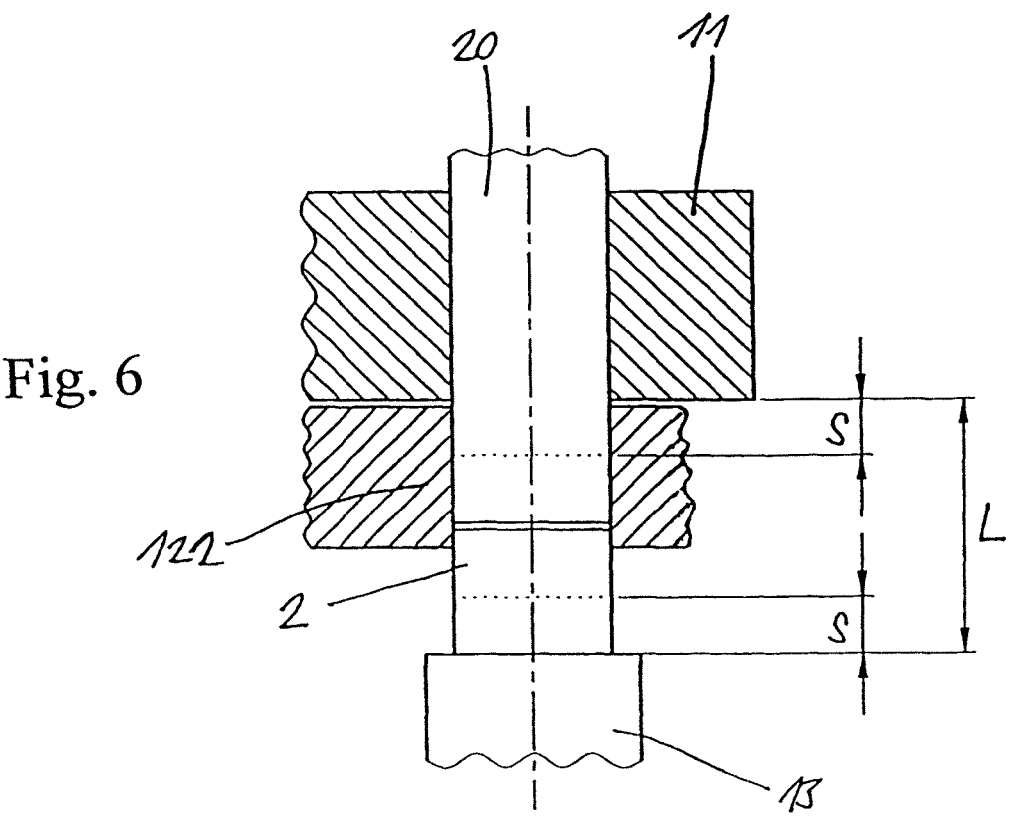
FIG. 6 schematically shows a position of a bar transition outside the safety regions, in which position no corrective shearing is necessary.

In FIG. 6, the distance between the bar stop 13 and the fixed blade 11 is designated by L. This distance L results from the desired length L of the bar sections to be subsequently processed; i.e., at another desired length, the bar stop 13 must normally be adjusted. Alternatively, the fixed blade 11 and the shearing blade 122 with the shearing plane could also be adjusted. A respective safety length S is depicted following the fixed blade 11 and the bar stop 13.

If the distances from the bar transition to the fixed blade 11 and from the bar transition to the bar stop 13 are in each case greater than the safety length S, as in the case shown in FIG. 6, shearing can be carried out backward without any problems.

Figure 7:
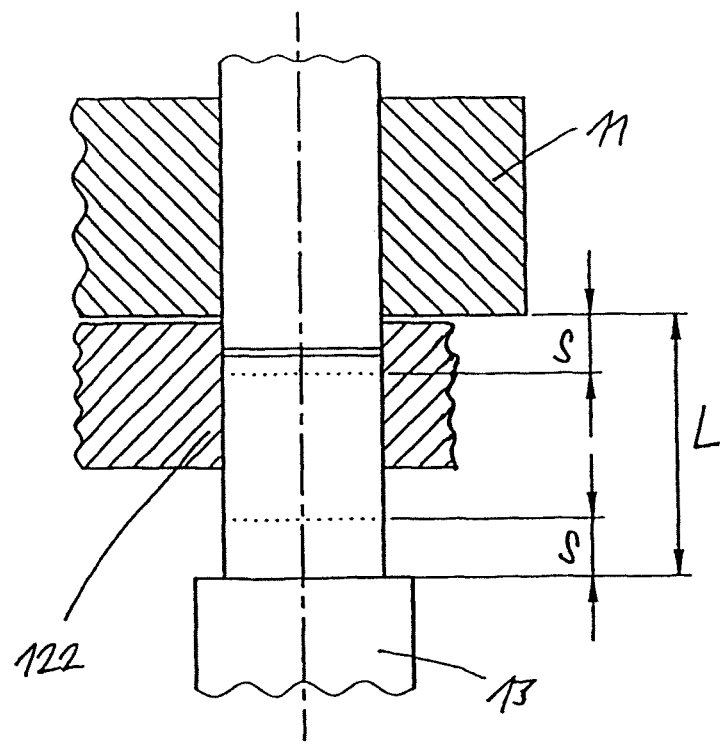
FIG. 7 schematically shows a position of the bar transition within a safety region, in which position corrective shearing is necessary.

On the other hand, if one of the distances from the bar transition to the fixed blade 11 or from the bar transition to the bar stop 13 is less than the safety distance S, as in the case shown in FIG. 7, neat shearing is no longer ensured, since the sheared bar section or the end section, remaining in the fixed blade 11, of the bar to be sheared is too small. The safety length S depends on various factors, such as, for example, bar thickness, material, design of the blades, etc., but in particular on the accuracy of the measuring arrangement.

In such a case, corrective shearing is carried out beforehand, during which an additional scrap piece is sheared by the second shearing blade 122 in a backward movement of the shearing part 12, the length of this scrap piece being such that the length, calculated with regard to this scrap piece, of the last bar section of a bar is greater than the predefined safety length S and is smaller than the desired length L minus the safety length S. The calculation of the length of the last bar section of a bar is made possible by the detection, mentioned in connection with FIG. 1, of the position of the bar transition from one bar to the next by means of the light barriers 7, 70 and 71.

The corrective shearing may be effected in various ways.

Figure 8:
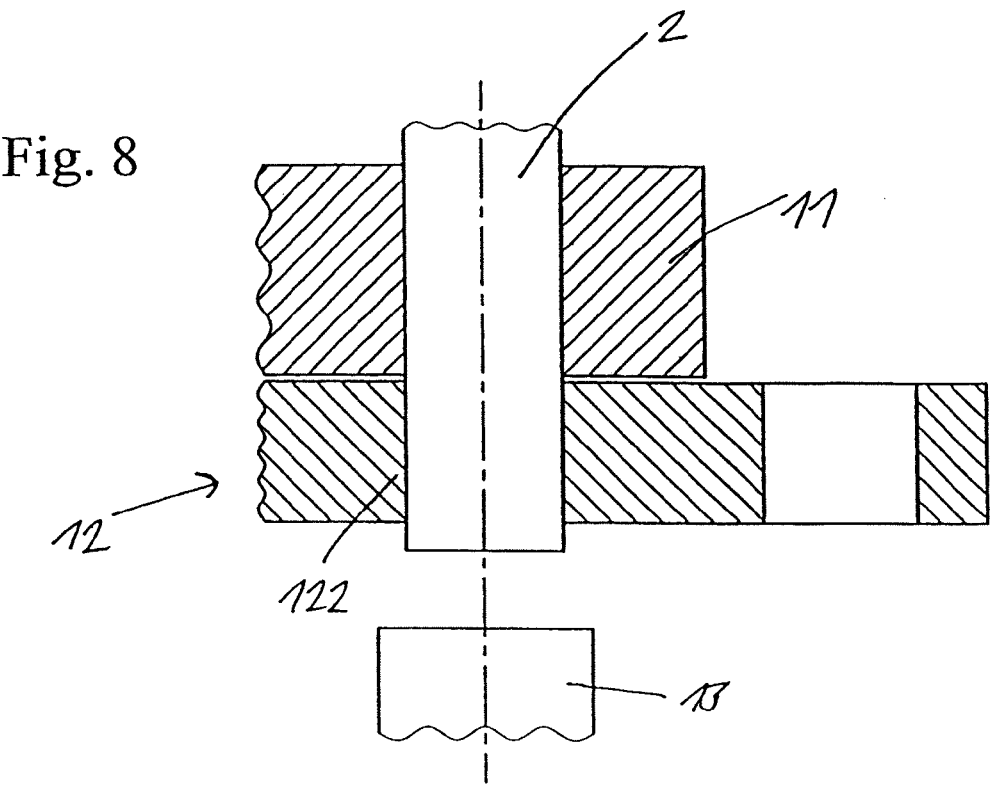
FIGS. 8 and 9 schematically show corrective shearing of a bar advanced to a reduced extent for this purpose.
Figure 9:
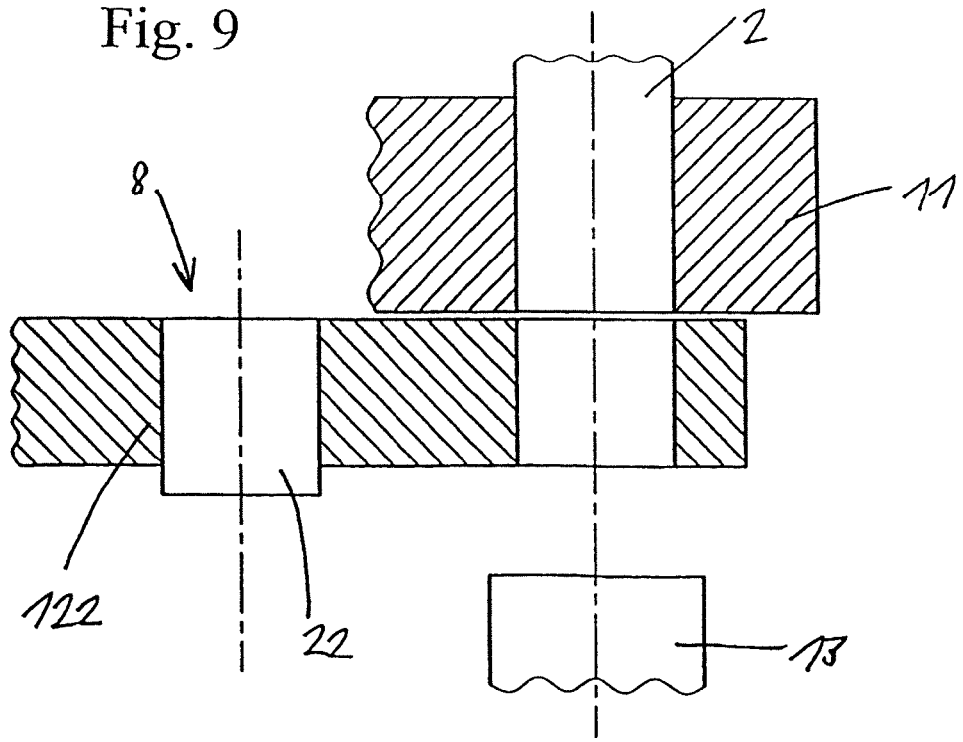

In the variant shown in FIGS. 8 and 9, the bar 2 to be sheared is not even advanced right up to the bar stop 13, it being necessary for this purpose to correspondingly control the bar draw-in device 4, and is sheared in this position in a backward movement of the second shearing blade 122. A scrap piece 22 having a length less than the desired length L can thus be sheared away and transported to the disposal point 8.

Figure 10:
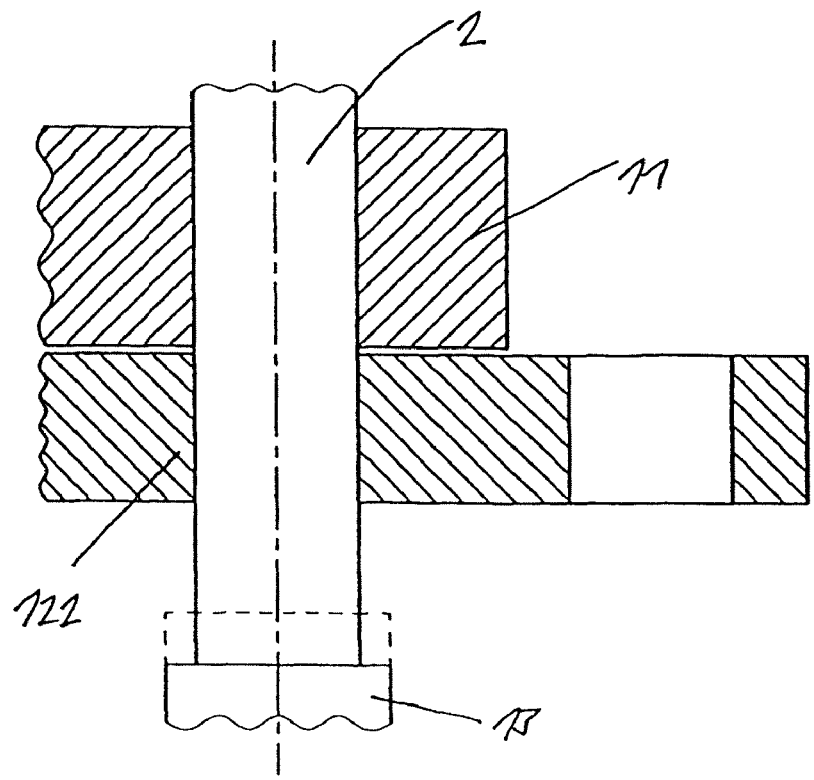
FIGS. 10 and 11 schematically show corrective shearing of a bar advanced further for this purpose by means of a displaceable bar stop.
Figure 11:
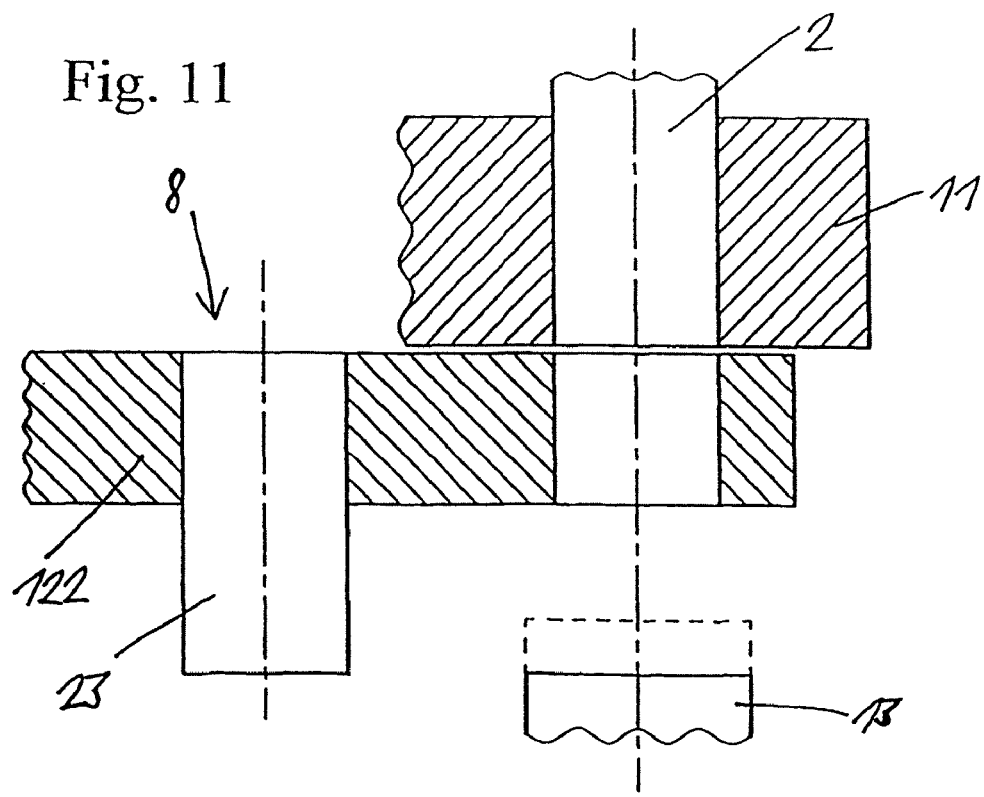

In the variant shown in FIGS. 10 and 11, the bar stop 13, for shearing in a backward movement of the second shearing blade 122, is shifted away from the fixed blade 11, i.e. from the shearing plane. The bar 2 to be sheared is advanced right up to the bar stop 13 shifted away and is sheared in this position by the second shearing blade 122. A scrap piece 23 having a length greater than the desired length L can thus be sheared away and transported to the disposal point 8. After that, the bar stop 13 is set back again into the initial position shown by a broken line.

With regard to the forming machines having shearing devices according to the invention described above, further constructional variants can be realized. The following may be expressly mentioned here:

The determination of the position of the bar transition from a preceding bar to be sheared to the following bar to be sheared need not necessarily be effected by means of light barriers, but rather can be realized by means of other bar-end monitoring units, preferably electronically.

The fixed blade and the shearing blades need not be closed circular blades. Other types of blades, such as half blades for example, are also conceivable.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of operating a forming machine having a shearing device comprising the steps of providing a forming machine having a shearing device for shearing a bar, providing the shearing device with a fixed blade, providing the fixed blade with a passage for feeding through the bar to be sheared, providing the shearing device with a shearing part which can be moved forward and backward parallel to the fixed blade and has a first shearing blade, with which a bar section projecting from the fixed blade can be sheared in a forward movement of the shearing part, and a second shearing blade, with which a bar section projecting from the fixed blade can be sheared in a backward movement of the shearing part, providing the shearing device with a disposal point, shearing bar sections having a desired length (L) by the first shearing blade in a forward movement of the shearing part, shearing bar sections having less than a desired length (L) by the second shearing blade in a backward movement of the shearing part and transporting as scrap pieces all of the bar sections sheared by the second shearing blade to the disposal point and not subsequently processing the scrap pieces in a forming station, and processing the sheared bar sections having the desired length (L) in at least one forming station of the forming machine after the shearing.

2. The method as claimed in claim 1, wherein the bar transition from a preceding bar to be sheared to the following bar to be sheared is sheared by the second shearing blade in a backward movement of the shearing part.

3. The method as claimed in claim 1, wherein the position of the bar transition from a preceding bar to be sheared to the following bar to be sheared is determined, the length which the last bar section at the end of the preceding bar to be sheared would have after the shearing of bar sections having the desired length (L) is calculated therefrom, and, if the calculated length of this last bar section is less than a predefined safety length (S) or is greater than the desired length (L) minus the safety length (S), corrective shearing is carried out, during which an additional scrap piece is sheared by the second shearing blade in a backward movement of the shearing part, the length of said scrap piece being such that the length, calculated with regard to this scrap piece, of the last bar section is greater than the predefined safety length (S) and less than the desired length (L) minus the safety length (S).

4. The method as claimed in claim 3, wherein the additional scrap piece is shorter than the desired length (L).

5. The method as claimed in claim 3, wherein the additional scrap piece is longer than the desired length (L).

6. The method as claimed in claim 3, wherein the length of the additional scrap piece is set by adjusting a bar stop, against which the bar-section-side end of the bar to be sheared bears during the shearing, and by advancing the bar to be sheared up to the bar stop.

7. The method as claimed in claim 4, wherein the shearing of an additional scrap piece having a length less than the desired length (L) is achieved by the bar to be sheared being advanced to a smaller extent than in the case of bar sections having the desired length (L).

* * * * *